US006785363B2

(12) United States Patent
Culliss

(10) Patent No.: US 6,785,363 B2
(45) Date of Patent: Aug. 31, 2004

(54) VOICE MESSAGE DELIVERY METHOD AND SYSTEM

(75) Inventor: Gary A. Culliss, Hampton, NH (US)

(73) Assignee: SoundBite Communications, Inc., Burlington, MA (US)

( * ) Notice: Subject to any disclaimer, the term of this patent is extended or adjusted under 35 U.S.C. 154(b) by 271 days.

(21) Appl. No.: 09/751,931

(22) Filed: Jan. 2, 2001

(65) Prior Publication Data

US 2002/0086662 A1 Jul. 4, 2002

(51) Int. Cl.[7] .......................... H04M 1/64; H04M 15/00
(52) U.S. Cl. ..................... 379/67.1; 379/76; 379/88.17; 379/88.18; 379/88.22; 379/114.01; 379/114.13
(58) Field of Search ........................... 379/67.1, 69, 76, 379/88.04, 88.13, 88.17, 88.18, 88.19, 88.22, 88.23, 88.24, 8.25, 88.26, 114.01, 114.02, 114.05, 114.1, 114.12, 114.13

(56) References Cited

U.S. PATENT DOCUMENTS

| | | | |
|---|---|---|---|
| 4,625,081 A | | 11/1986 | Lotito et al. ............. 379/88.26 |
| 4,757,525 A | * | 7/1988 | Matthews et al. ............ 379/88 |
| 4,941,168 A | | 7/1990 | Kelly, Jr. ..................... 379/69 |
| 4,972,461 A | * | 11/1990 | Brown et al. ................. 379/67 |
| 5,333,180 A | | 7/1994 | Brown et al. ............ 379/88.06 |
| 5,371,787 A | | 12/1994 | Hamilton .................... 379/386 |
| 5,430,792 A | | 7/1995 | Jesurum et al. .......... 379/88.01 |
| 5,638,424 A | | 6/1997 | Denio et al. ............. 379/88.18 |
| 5,652,789 A | | 7/1997 | Miner et al. ........... 379/201.01 |
| 5,724,420 A | | 3/1998 | Torgrim ...................... 379/372 |
| 5,764,732 A | * | 6/1998 | Lubachevsky ............... 379/67 |
| 5,822,405 A | | 10/1998 | Astarabadi .................... 379/88 |
| 5,903,627 A | * | 5/1999 | Shaffer et al. ............. 379/67.1 |
| 6,097,791 A | * | 8/2000 | Ladd et al. .............. 379/88.19 |
| 6,169,786 B1 | | 1/2001 | Dunn et al. .............. 379/88.25 |
| 6,181,779 B1 | | 1/2001 | Hwang ...................... 379/67.1 |
| 6,195,417 B1 | | 2/2001 | Dans ......................... 379/67.1 |
| 6,215,858 B1 | * | 4/2001 | Bartholomew et al. .. 379/88.17 |
| 6,226,360 B1 | | 5/2001 | Goldberg et al. ............. 379/69 |
| 6,269,151 B1 | | 7/2001 | Hanson ....................... 379/69 |
| 6,285,745 B1 | | 9/2001 | Bartholomew et al. .. 379/88.17 |
| 6,351,522 B1 | | 2/2002 | Vitikainen ................. 379/67.1 |
| 6,396,920 B1 | | 5/2002 | Cox et al. ............. 379/266.02 |
| 6,424,702 B1 | | 7/2002 | Blumenschein et al. ... 379/67.1 |

OTHER PUBLICATIONS

Hoosain, Allan, Office Action, U.S. patent application No. 09/839,840, mailed on Sep. 5, 2002, 11 pgs.
Hoosain, Allan, Office Action, U.S. patent application No. 09/839,840, mailed on Feb. 21, 2003, 13 pgs.
Hoosain, Allan, Office Action, U.S. patent application No. 09/839,840, mailed on Jun. 18, 2003, 10 pgs.
Hoosain, Allan, Office Action, U.S. patent application No. 09/839,840, mailed on Nov. 10, 2003, 10 pgs.
Hoosain, Allan, Office Action, U.S. patent application No. 10/051,453, mailed on Apr. 2, 2003, 10 pgs.
Hoosain, Allan, Office Action, U.S. patent application No. 10/051,453, mailed on Oct. 22, 2003, 11 pgs.

* cited by examiner

*Primary Examiner*—Allan Hoosain
(74) *Attorney, Agent, or Firm*—Testa, Hurwitz & Thibeault, LLP

(57) ABSTRACT

A voice message delivery method and system for delivering voice messages from a Sender to a Receiver, where neither the Sender nor the Receiver are required to be Subscribers to the system. The invention allows voice messages to be delivered to non-Subscribers and, if they are not how, to be recorded into the existing answering machine or voicemail system of the Recipient. Advertisements played during either the process of sending or receiving a message provide revenue for a company providing the service of the present invention without requiring users to become Subscribers.

25 Claims, 8 Drawing Sheets

Apparatus

VOICE MESSAGE DELIVERY METHOD AND SYSTEM

BACKGROUND OF THE INVENTION

1. Field of the Invention

The present invention relates to telecommunications, and more particularly pertains to a method and apparatus for sending recorded telephonic messages.

2. Description of the Prior Art

Voice messaging systems are known and used for sending and receiving messages between users that are Subscribers of the system. A "Subscriber" is a person that has actively subscribed to the voice messaging system by creating either (1) a voice mailbox and/or (2) a billing relationship with the provider where the Subscriber agrees to pay money, either directly or indirectly through the purchase of other services, for use of the voice messaging system.

A voice mailbox is a storage area within the voice messaging system that is addressable by a number. The number selected to address the voice mailbox may be any number, such a number coinciding with the Subscriber's telephone number. The voice mailboxes of prior art voice messaging systems are quite difficult to access and require that the subscriber both (1) periodically call into the system to determine if there are any messages in the mailbox, and (2) call into the system to listen to messages. Most people, however, already have separate voicemail systems or answering machines that answer the telephone and record messages from live callers. As such, these prior art voice messaging systems create yet another mailbox that both senders and/or receivers must check in addition to their existing answering machine or separate voicemail system.

Examples of a subscriber billing relationship include, but are not limited to, a monthly subscription fee, the purchase of related or unrelated services such as local telephone calling or long distance calling, or the outright purchase of a voice messaging system (hardware or software) through either an installment sale or single payment. It is through these and other types of billing relationships, or by creating a mailbox as described above, that people actively subscribe to become Subscribers to prior art messaging systems.

After actively subscribing to the voice messaging service and/or creating a separate mailbox, a Subscriber can send and receive messages with other Subscribers by calling into the system, logging into the particular mailbox and then creating and sending messages to mailboxes of other Subscribers within the same voice messaging system.

An exemplary mode of operation of a prior art voice messaging system is shown in flow chart form in FIG. 1. To record and send a message, a Subscriber, having already actively subscribed to the service, places a telephone call into the voice messaging system at step 10. The Subscriber then signs-in to his voice mailbox at step 20, records a voice message at step 30, and enters a telephone number of an intended recipient at step 40. At step 50, the voice messaging service determines if the intended recipient is a Subscriber or not. If the recipient is a Subscriber, the voice messaging system deposits the voice message in the recipient's voice mailbox at step 60. The intended recipient can thereafter call into the voice messaging system and access the voice message at step 70. If, however, the intended recipient is a non-Subscriber, the voice messaging service will call the Recipient and play the recorded message as shown at step 80.

Examples of conventional voice messaging methods and systems are disclosed in at least the following patents, all of which are herein incorporated by reference: U.S. Pat. No. 6,097,791 entitled "Voice-messaging System with Non-user Outcalling and Auto-provisioning Capabilities," U.S. Pat. No. 5,764,732 entitled "Called Party Mailbox Service," and U.S. Pat. No. 4,998,272 entitled "Personal Voice Mail System."

Although widely accepted for commercial use, prior art voice messaging systems have had only moderate success in the residential market. Telephone companies have expended tremendous effort to market prior art voice messaging systems to the general public. Numerous television and radio advertisements have been aired to teach consumers that they can use these systems to not just answer calls, but to send, receive, reply, and forward voice messages, and to broadcast a single voice message to multiple recipients. Nevertheless, such voice messaging systems are not widely used among residential customers.

One reason voice messaging systems are not widely used among residential customers is that many residential customers already use existing stand-alone answering machines and have no need or interest in maintaining a separate voice mailbox, as noted above. Another reason is prior art voice messaging systems will only send messages from a Subscriber of the voice messaging systems and do not allow a non-Subscriber to send a voice message to a non-Subscriber.

Further, prior art voice messaging systems require that a Subscriber dial into the system to retrieve messages; they do not work with a Subscriber's existing answering machine. Instead, they require that a sender of a message to a Subscriber of the voice message system (such as a Recipient who replies to the Sender's original message) deposit the message in the Subscriber's voice mailbox. The Subscriber must then call into the voice messaging system to (1) check to see if there are any messages in the voice mailbox, and (2) listen to the messages, if there are any. As such, a sender of a message cannot be sure when the Subscriber will (1) notice that a new message is present within his voice mailbox, and (2) listen to the message. Only when the Subscriber has completed both of these steps will the Subscriber receive the Sender's information. Further, prior art voice messaging systems are not designed to work with existing answering machines and voicemail systems of non-subscribers on a regular basis without soliciting the Recipient who is a non-Subscriber to become a Subscriber.

Because of these and other limitations, including the small number of residential voice messaging system users, the utility of existing voice messaging systems is quite low. As such, it can be appreciated that further improvements are needed in such a system.

SUMMARY OF THE INVENTION

Accordingly, it is an object of the present invention to provide a voice messaging delivery method and system in which neither the Sender nor the Recipient of a voice message is required to be a Subscriber.

It is another object of the present invention to provide a voice messaging delivery method and system in which an initial voice message can be sent from a Sender to a Recipient; and a reply to that initial voice message can be sent from the Recipient back to the Sender without either the Sender or Recipient being a Subscriber to the voice messaging system.

It is another object of the present invention to provide a voice messaging delivery method and system in which an initial voice message can be sent by a telephone call to a Recipient's existing answering machine that is not part of the voice messaging delivery system; and a reply to the initial voice message can be sent by a telephone call to a Sender's existing answering machine that is not part of the voice messaging delivery system.

It is another object of the present invention to provide a voice messaging delivery method and system in which messages are immediately delivered to a Recipient or Reply-Recipient (the original Sender who receives a reply message) to (1) immediately notify the Recipient or Reply-Recipient of the existence of the message, and (2) immediately allow the Recipient or Reply-Recipient to hear the message.

It is another object of the present invention to provide a voice messaging delivery method and system that can be supported by advertising messages such that a company providing a service according to the present invention can do so in a commercially reasonable and sustainable fashion without requiring either the Sender or Recipient to be Subscribers to the system or establish a billing relationship with the company.

A voice messaging delivery method and system according to the present invention provides a means for delivering voice messages from a Sender to a Receiver, where neither the Sender nor the Receiver are required to be Subscribers to the system. The invention allows voice messages to be delivered to non-Subscribers and, if they are not home, to be recorded into the existing answering machine or voicemail system of the Recipient (including an original Sender who is the Recipient of a reply message). Advertisements played during either the process of sending or receiving a message provide revenue for a company providing the service of the present invention without requiring users to become Subscribers.

This brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the method set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other methods and systems for carrying out the objects and purposes of the present invention. It is important, therefore, that the claims be regarded as including such equivalent constructions insofar as they do not depart from the spirit and scope of the present invention.

DESCRIPTION OF THE PREFERRED EMBODIMENTS

Figure 1:
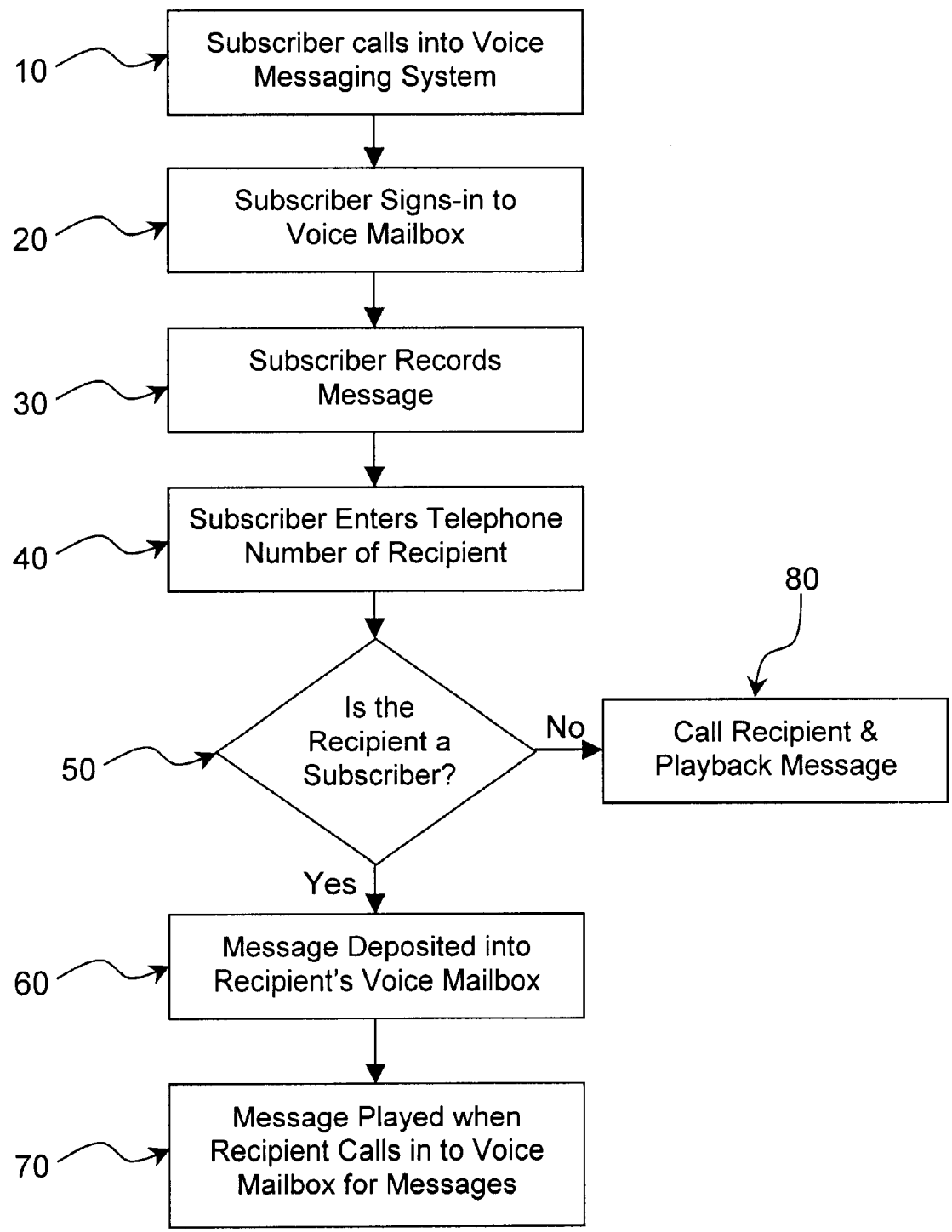
FIG. 1 shows a flow chart illustrating the call flow operation of a prior art voice messaging service.
Figure 2:
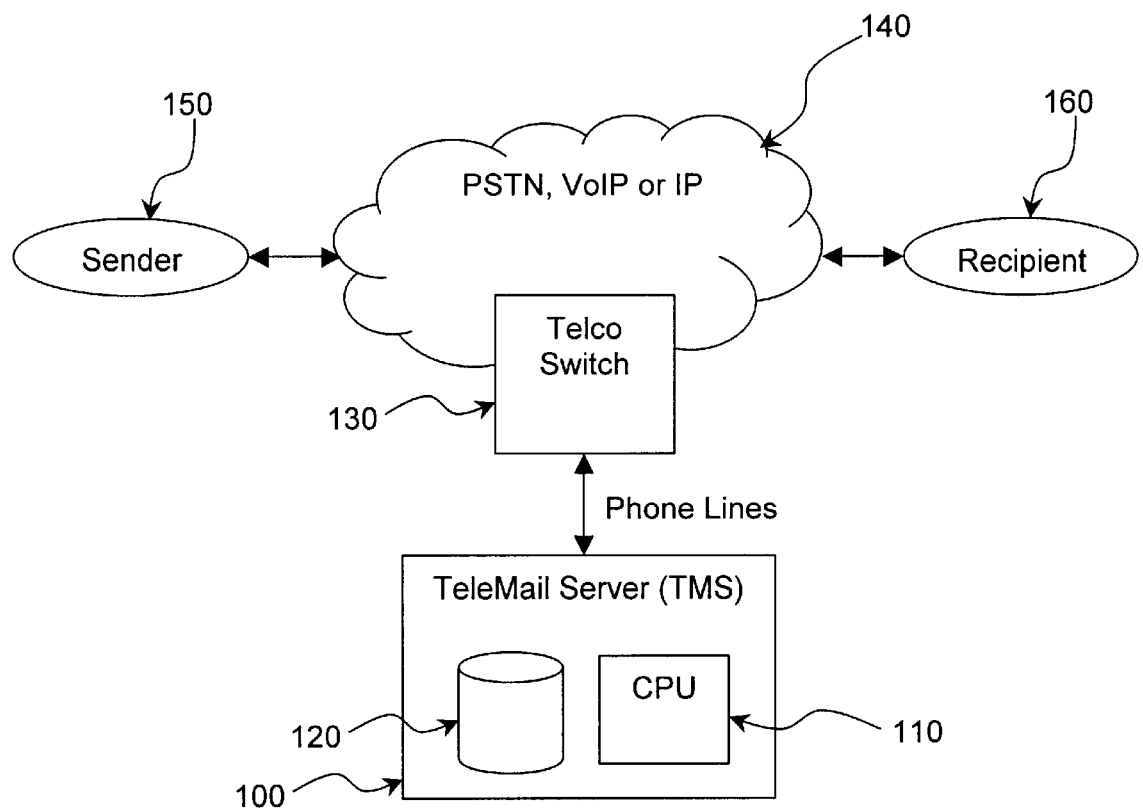
FIG. 2 shows a block diagram of the apparatus of the present invention.

As shown in FIG. 2, the present invention utilizes a TeleMail Server 100 ("TMS"), which includes a CPU 110 and data storage 120. The TMS 100 is connected to a conventionally-known telecommunications switch 130 by phone lines. The switch 130 is connected to a PSTN or VoIP cloud 140 in a manner known to those skilled in the art. Through these connections, a Sender 150 is able to dial a telephone and connect through the cloud 140 and switch 130 to the TMS 100. Similarly, a Recipient can be connected via a telephone with the TMS 100. By telephone is meant any wireless or wireline device that communicates with the cloud 140 through audio and/or video means. The connections shown in FIG. 2 are exemplary only and there are other means for connecting the Sender or Recipient with the TMS that will be apparent to those skilled in the art.

Figure 3:
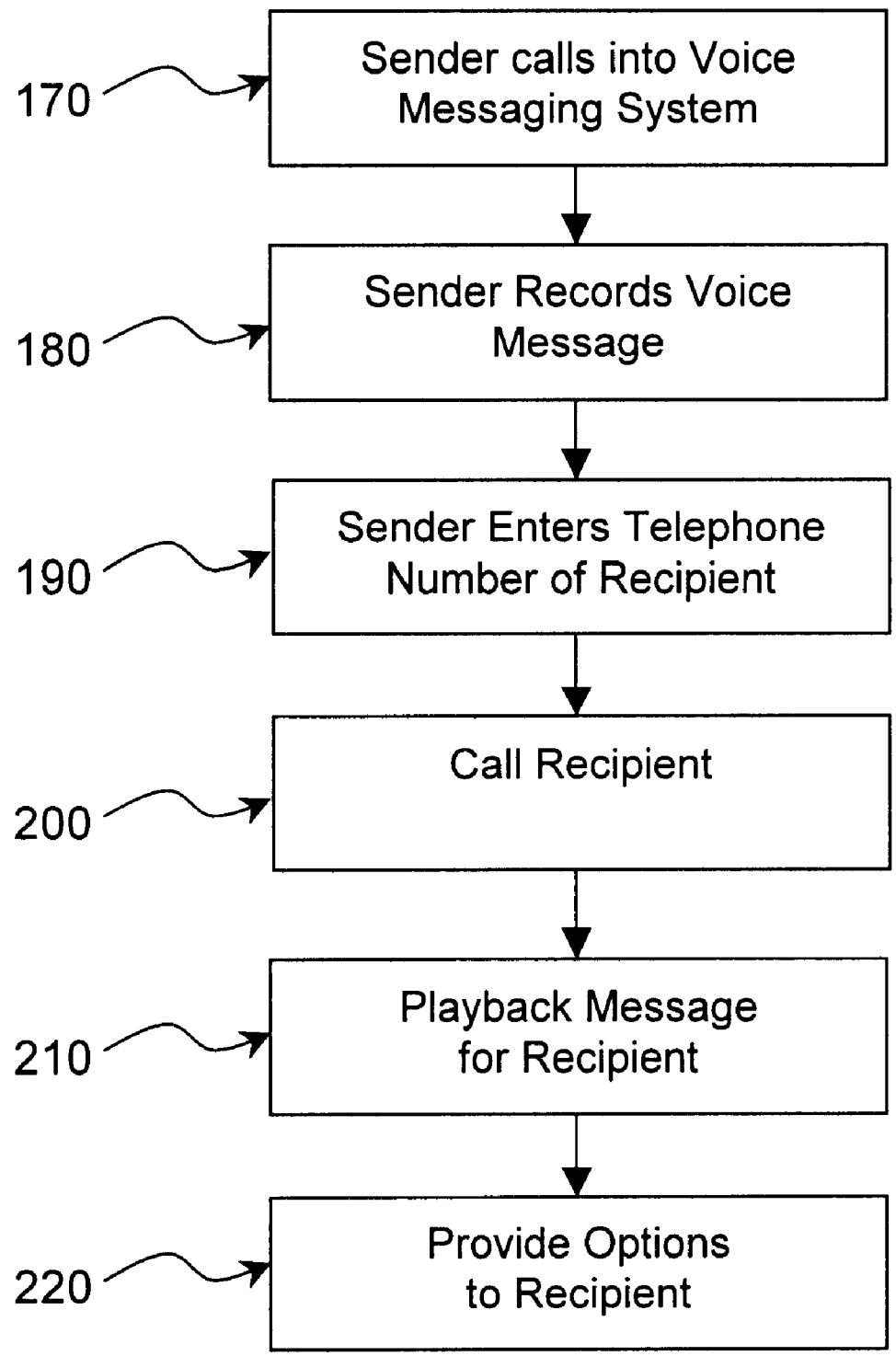
FIG. 3 shows a flow chart illustrating the call flow operation of the present invention.

FIG. 3 illustrates a call flow showing the function of the present invention. In use, a Sender 150 connects with the TMS, such as by dialing a telephone to place an inbound call into the TMS 100, as shown at step 170. The TMS 100 answers the call and, preferably without requiring that the Sender 150 be a Subscriber to any service, permits the Sender to record a voice message at step 180. Either before or after recording the message at step 170, the TMS 100 then prompts the Sender 150 to enter the telephone number of the Recipient 160 at step 190. The TMS 100 then places an outbound call to the Recipient at step 200 to deliver the recorded message.

In delivering the message at step 200, the TMS 100 will handle a variety of situations. If the Recipient's phone is busy or there is otherwise no answer, the system will hang up and call back at a later time for a predetermined number of attempts. If, after reaching the predetermined number of attempts, the TMS 100 continues to encounter a busy signal or no answer by the Recipient 160, the TMS will return the message back to the Sender 150 by placing a call to the Sender's telephone number, alerting the Sender that the message was not delivered, and allowing the Sender to specify that the TMS 100 continue attempting to reach the Recipient 160 at the same number and/or allow the Sender to enter a different telephone number for either the same or a new Recipient. Upon notifying the Sender 150 of the failed attempt to deliver the message, the TMS 100 may also playback the message for the Sender 150 or allow the Sender to record a new message for addition to, or substitution with, the original message.

When the Recipient's phone is answered, the TMS 100 determines if the phone is answered by a person or an existing answering machine. If the phone is answered by an existing answering machine, the TMS 100 will wait for the recording beep and play the message at step 210 into the existing answering machine for recording therein. By existing answering machine is meant any device or system for answering the telephone to record a message that is not part of the TMS 100. An existing answering machine may be additionally or alternatively defined as any device or system for answering the telephone to record a message that is not part of the TMS 100 and/or that does not communicate with the TMS through a predefined protocol other than the recording beep or pre-recorded human voice greeting recorded on the answering machine and intended to be interpreted and understood by other human beings calling into the existing answering machine.

If the Recipient 160 answers the phone, the TMS 100 will play the message for the Recipient at step 210. After playback of the message for the Recipient 160, the TMS 100 will offer the Recipient several options at step 220, including but not limited to, hearing the message again, replying to the message, forwarding the message and saving the message. If the Recipient 160 selects to hear the message again, the message is played back for the Recipient again as shown at step 210.

Figure 4:
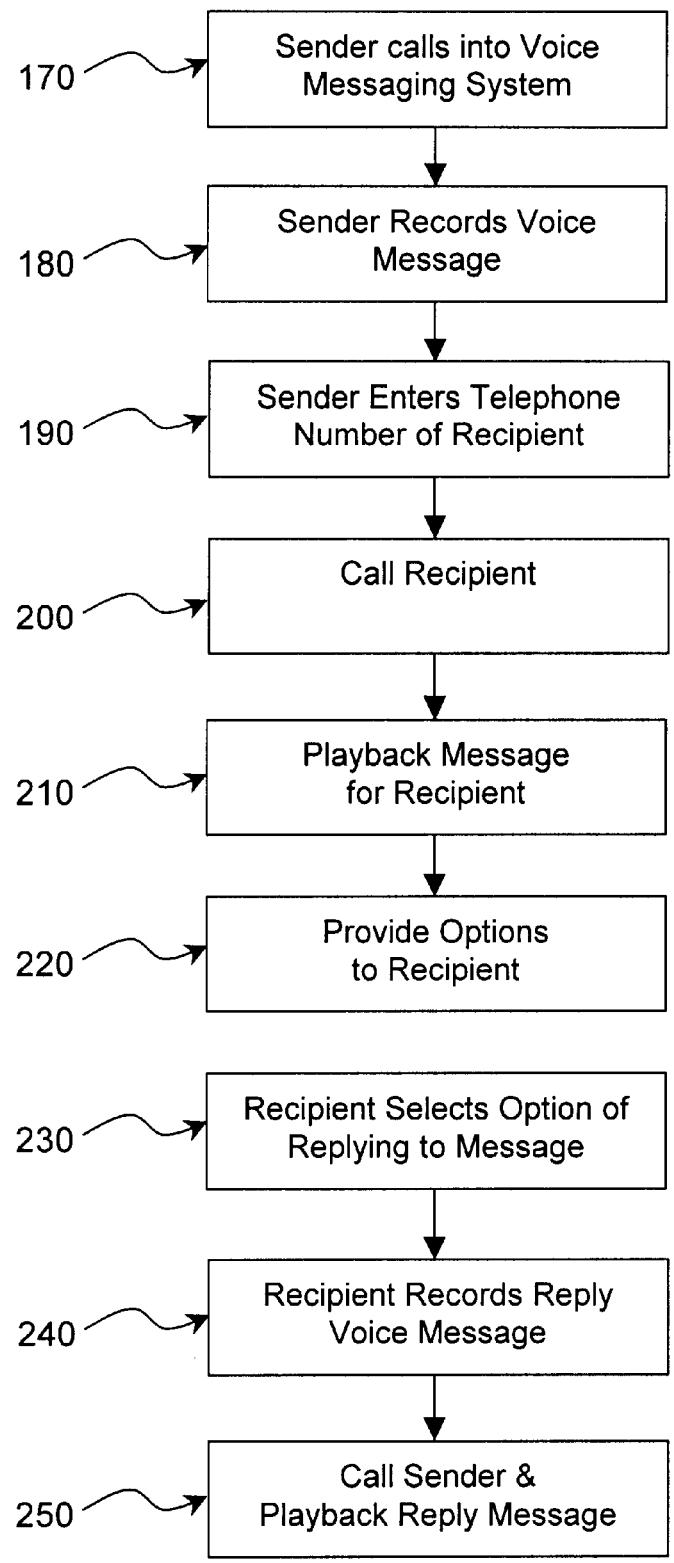
FIG. 4 shows a flow chart illustrating a reply operation of the present invention.

FIG. 4 illustrates the call flow for allowing a Recipient 160 to reply to an original message sent by a Sender 150 to the Recipient. In this example, and preferably while the Recipient is still on the same call from the delivery of the original message, the Recipient 160 selects the option of replying 230 to the Sender 150 and the TMS 100 then records a reply message at step 240. The TMS 100 then calls the Sender 150 at step 250 to deliver the reply message in a manner similar to that described above for the delivery of the original message from the Sender to the Recipient. In addition to delivering and playback of the reply message, the TMS 100 could additionally deliver and playback the original message to the Sender 150. Also as described above, should the TMS 100 encounter a busy signal, no answer or an answering machine, the call will be handled in a similar manner as with the Recipient 150 on the original call.

Figure 5:
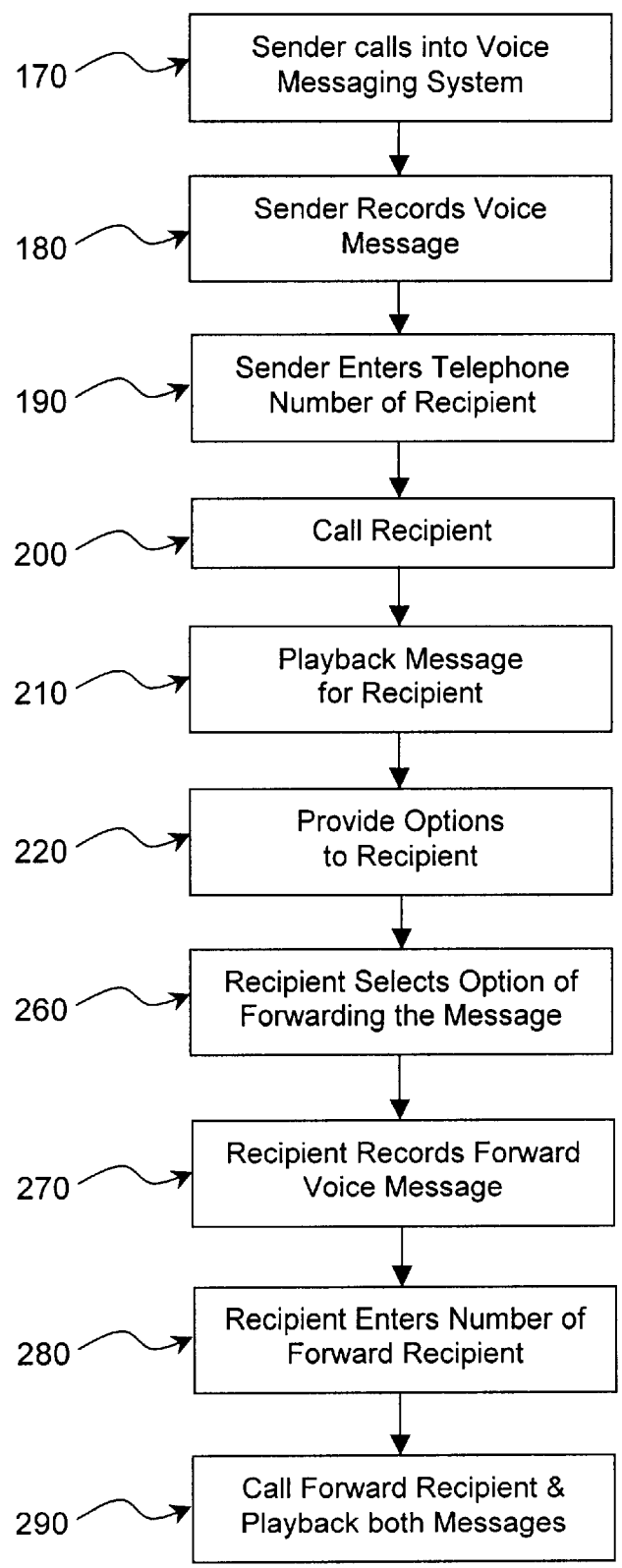
FIG. 5 shows a flow chart illustrating a forwarding operation of the present invention.

FIG. 5 illustrates the call flow for allowing a Recipient 160 to forward an original message sent by a Sender 150 to the Recipient. In this example, the Recipient 160 selects the option of forwarding 260 to a Forward Recipient. If desired, the TMS 100 optionally could then record a forward message at step 270 for delivery along with the original message. The Recipient 160 is then permitted to enter a telephone number of the Forward Recipient at step 280. The TMS 100 then calls the Forward Recipient at step 290 to deliver the forward message in a manner similar to that described above for the delivery of the original message from the Sender to the Recipient. If desired, the TMS 100 optionally could deliver and playback the forward message to the Forward Recipient along with the original message. Also as described above, should the TMS 100 encounter a busy signal, no answer or an answering machine while attempting to call the Forward Recipient, the call will be handled in a similar manner as with the Recipient 150 on the original call.

Figure 6:
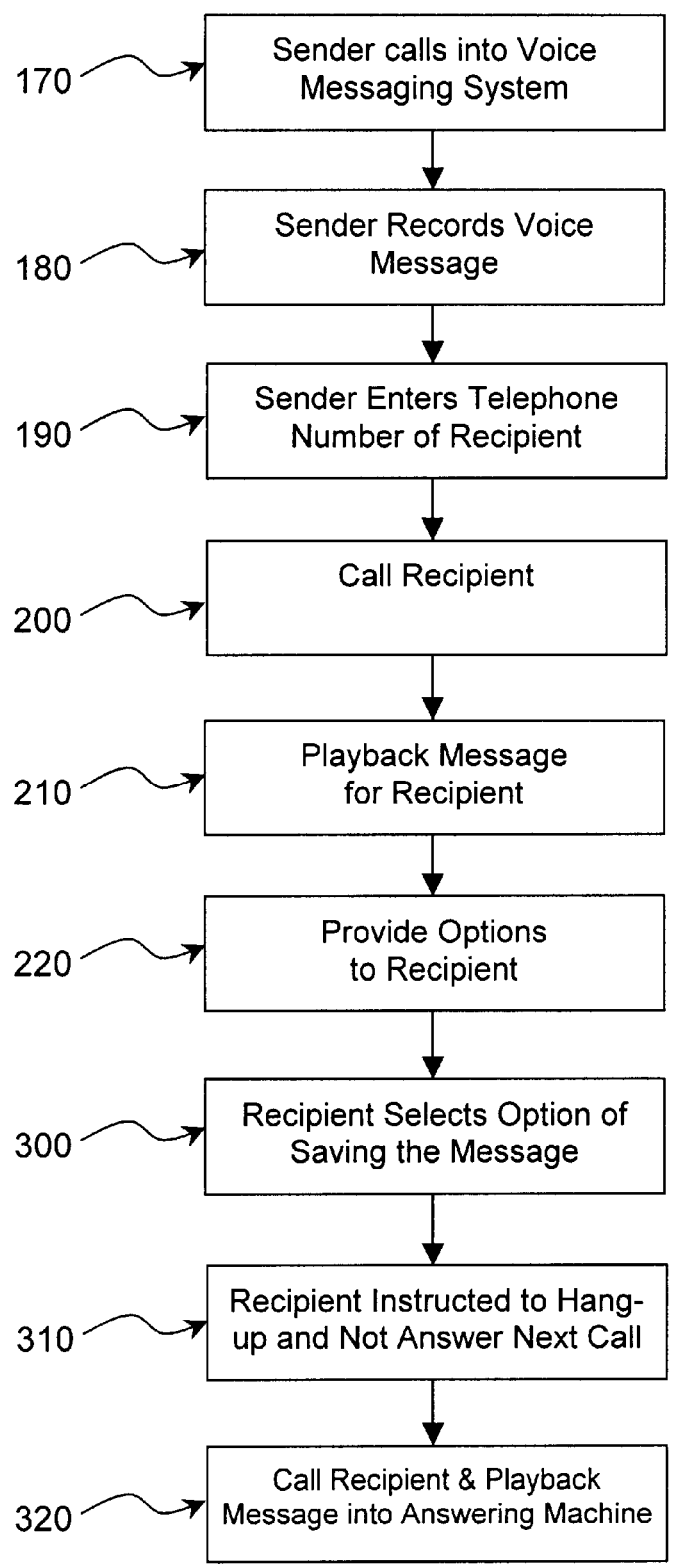
FIG. 6 shows a flow chart illustrating a save operation of the present invention.

FIG. 6 illustrates the call flow for allowing a Recipient 160 to save an original message sent by a Sender 150 to the Recipient. In this example, the Recipient 160 selects the option of saving 300 the original message. The TMS 100 then instructs the Recipient to hang-up and not answer the next call at 310. The TMS 100 then calls the Recipient 160 again at step 320 to deliver the original message back to the Recipient for recording into the Recipient's existing answering machine. As described above, should the TMS 100 encounter a busy signal, no answer or an answering machine, the call will be handled in a similar manner as with the Recipient 150 on the original call. Because the Recipient has been instructed not to answer the phone, the TMS 100 should encounter an existing answering machine and will record the original message onto the answering machine as described above.

Figure 7:
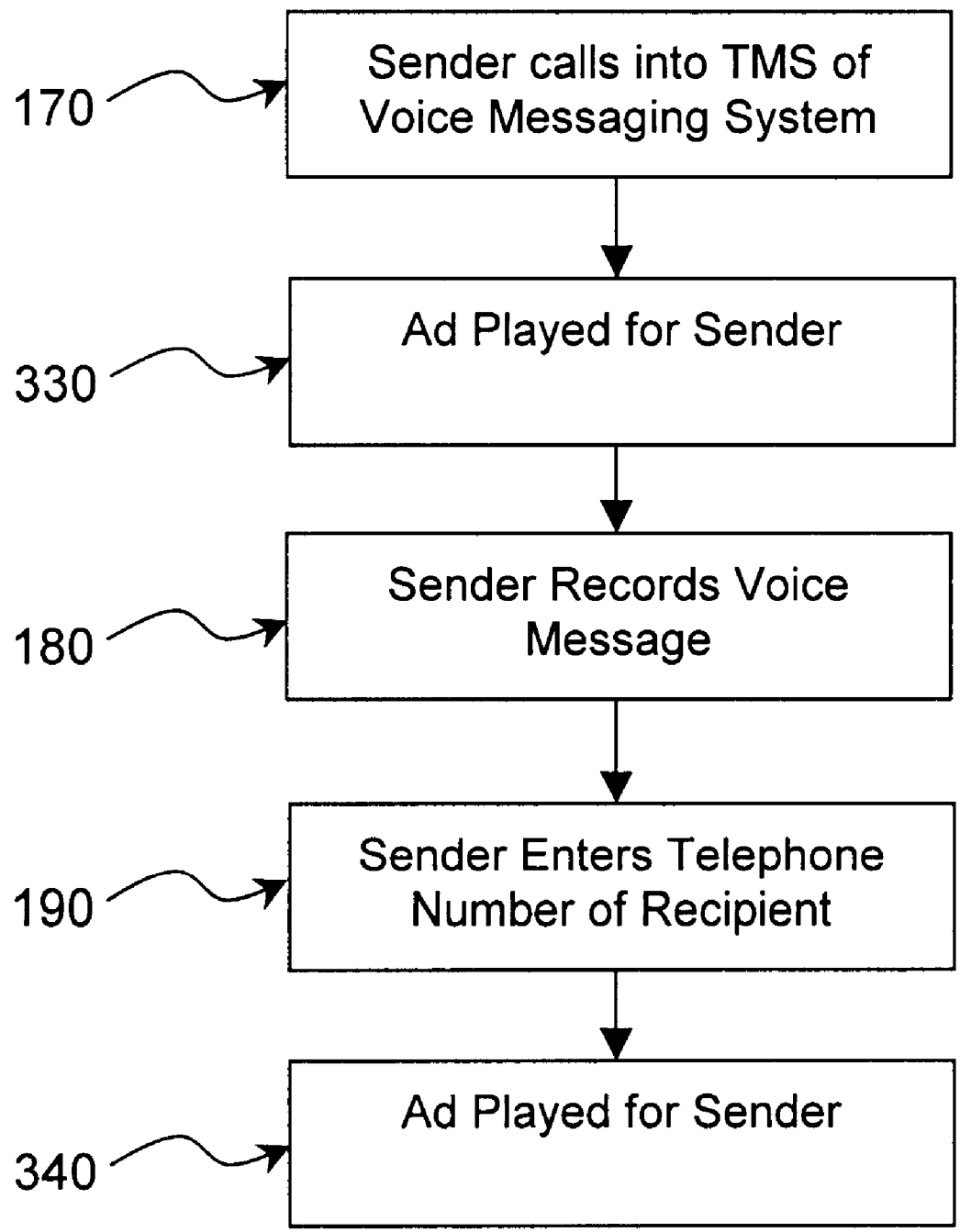
FIG. 7 shows a flow chart illustrating the present invention, including the delivery of one or more audio advertisements to a Sender.

FIG. 7 illustrates the placement of audio advertising within the call flow to generate revenue for the company providing a service based on the present invention, which allows such company to provide the service for free and without requiring either the Sender or Recipient to set up a mailbox, to establish a billing relationship with the company or to otherwise become a Subscriber to the system. After the Sender 150 connects with the TMS at step 170, the TMS 100 could then play an advertisement for the Sender at step 330. Such an advertisement may comprise an audio advertisement from a third-party company that is played for the Sender 150. The third-party company, in return, pays the company providing the service of the present invention a fee for playing the advertisement to the Sender. In this manner, the Sender 150 is not required to be a Subscriber to the system because the company providing the service of the present invention can derive revenue from someone other than the Sender; in this case the third-party advertiser.

The TMS 100 can play advertisements to the Sender in a number of places within the call flow, such as before the recording of the message at 330, or after the Sender has entered the telephone number of the Recipient 160 in step 190 as shown at step 340. Similarly, the TMS 100 can play audio advertisements to the Recipient 160 as shown at 350 and/or 360 in FIG. 8. In this case, the TMS 100 can play an advertisement for the Recipient 160 between placing the call to the Recipient at step 200 and playing the message back for the Recipient, also shown at step 200.

Figure 8:
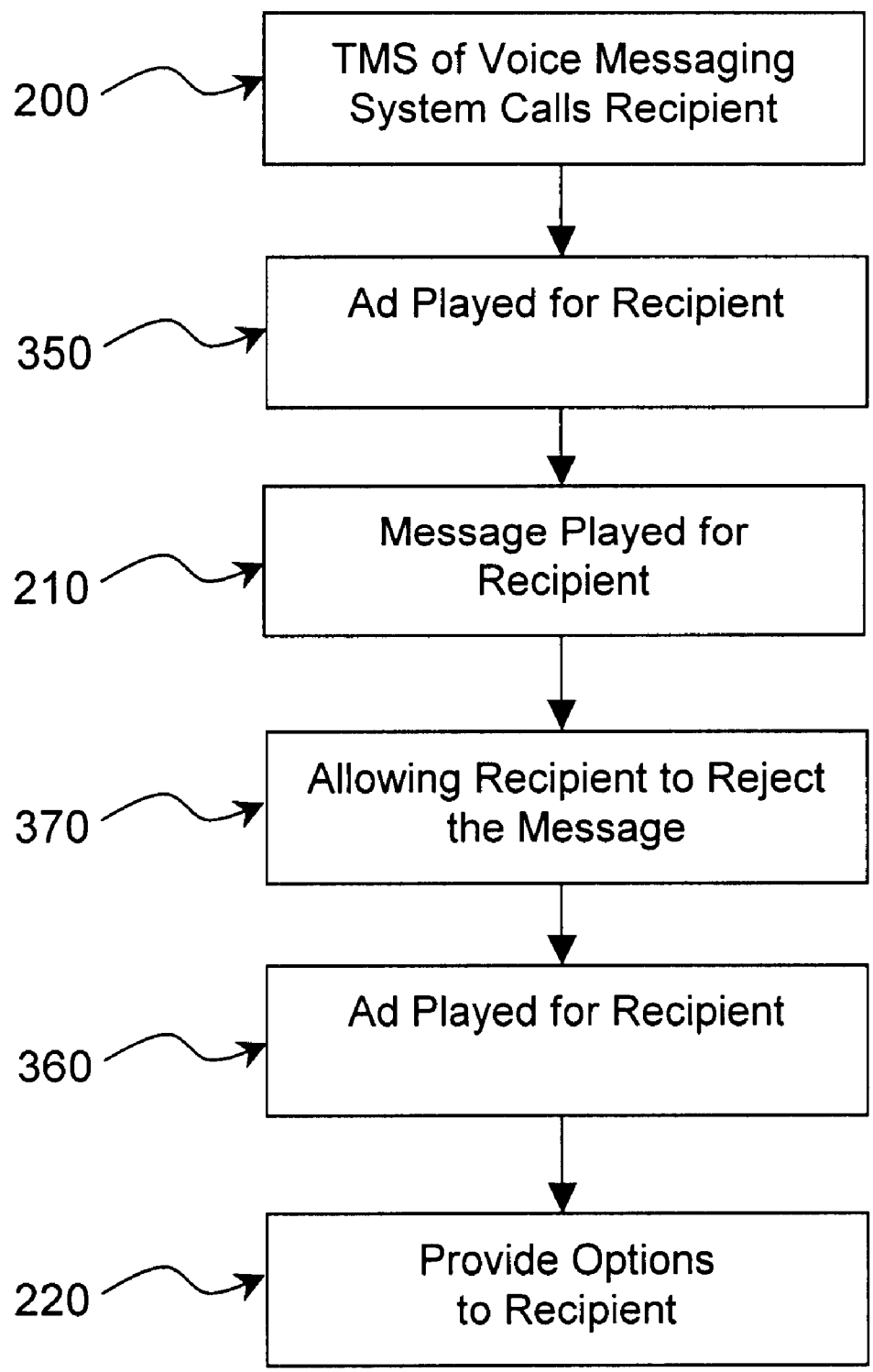
FIG. 8 shows a flow chart illustrating the present invention, including the delivery of one or more audio advertisements to a Recipient.

The audio advertisements of FIGS. 7 and 8 are preferably interactive. By interactive is meant that the TMS 100 permits a user to select an option with respect to the advertisement, such as hearing one or more alternative or longer advertisements, connecting via a live call with the third-party advertiser, forwarding the advertisement as a voice message, replying to the third-party advertiser with a voice message, requesting that the third-party advertiser send the user some information via a different medium, such as email or postal service, providing permission for future interaction with the third-party advertiser, or completing a commercial transaction with the third-party advertiser.

By placing the advertisement at particular positions within the call flow, users are more likely to interact with the advertisement than when the advertisements are placed at other positions within the call flow. For example, and as shown in FIG. 7, by placing the advertisement after the Sender 150 has completed some or all of the steps of sending a message, the Sender is more likely to interact with the advertisement. Similarly, in FIG. 8, by placing the advertisement after the Recipient 160 has heard the message, the Recipient is more likely to interact with the ad.

FIG. 8 also shows that the present invention may include an option 370 presented to the Recipient (in the case of a reply, the Sender 150; in the case of a forward, the Forward Recipient) to reject the message. By reject is meant any action that disposes of the message, such as returning it to the Sender 150, having the TMS 100 call back to deliver it to another Recipient at the same telephone number, blocking the number of the Sender from future messages, or blocking all future messages from being delivered by the TMS 100 of the present invention.

While the present invention has been described in the context of audio messages and advertisements, the invention may also utilize video messages and advertisements delivered through devices now known or later developed. For example, video cameras and displays (not shown) for both the Sender and Recipient could be connected to the cloud 140 by methods or apparatus now known or later developed, to enable the delivery of video messages and vide advertisements that may also include audio.

While the present invention has been described as utilizing the telephone system to connect the Sender and Recipient with the TMS 100, the invention may also utilize any other communications medium now known or later developed outside of the public telephone network and systems. For example, the Sender and Recipient could either or both be connected to the TMS 100 by wireless devices, Internet connections, or other communication means, to enable the sending and receiving of audio and/or video messages.

While the present invention has shown call flows in a number of different instances, the steps of the present invention may occur in a different order to accomplish a similar objective, albeit at different levels of efficiency with respect to human factors and possible pre-existing human expectations. For example, the steps of recording a message 180 and entering the telephone number 180 of the Recipient 160 shown in FIG. 3 can be reversed so that the Sender 150 first enters the telephone number of the Recipient and then records the message. Other steps can similarly be re-ordered as well. It should be noted, however, that the particular layout of the steps can have a significant impact upon useability of the system. By usability is meant the ease of use and willingness of people to use the system without making mistakes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in form, function and manner of operation, implementation and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for delivering voice messages using a voice messaging system, comprising:
    (a) receiving an inbound call from a Sender, wherein the Sender lacks a voice mailbox within the voice messaging system and the Sender lacks an agreement to pay a provider of the voice messaging system for the use of the voice messaging system;
    (b) recording, free of charge to the Sender, an original audio message from the Sender intended for a Recipient;
    (c) receiving from the Sender a telephone number of the Recipient;
    (d) placing a first outbound call by calling the telephone number of the Recipient; and
    (e) playing, free of charge to the Sender, the original audio message for the Recipient.

2. The method for delivering voice messages of claim 1 further comprising:
    (f) receiving a reply telephone number of the Sender.

3. The method for delivering voice messages of claim 2 further comprising:
    (g) recording a reply audio message from the Recipient intended for the Sender;
    (h) placing a second outbound call by calling the reply telephone number of the Sender; and
    (i) playing the reply audio message for the Sender.

4. The method for delivering voice messages of claim 1 further comprising:
    (f) forwarding the original audio message.

5. The method for delivering voice messages of claim 4, wherein step (f) comprises:
    (f-1) receiving from the Recipient a telephone number of a Forward Recipient;
    (f-2) placing a second outbound call by calling the telephone number of the Forward Recipient; and
    (f-3) playing the original audio message for the Forward Recipient.

6. The method for delivering voice messages of claim 5 further comprising:
    (g) recording a forward audio message from the Recipient; and
    (h) playing the forward audio message for the Forward Recipient.

7. The method for delivering voice messages of claim 1 further comprising:
    (f) saving the original audio message.

8. The method for delivering voice messages of claim 7, wherein step (f) comprises:
    (f-1) instructing the Recipient to not answer the telephone on the next call;
    (f-2) terminating the first outbound call;
    (f-3) placing a second outbound call by calling the telephone number of the Recipient; and
    (f-4) recording the audio message into an answering machine of the Recipient.

9. The method for delivering voice messages of claim 1 further comprising:
    (f) playing a first audio advertisement for the Sender.

10. The method for delivering voice messages of claim 9 further comprising:
    (g) playing a second audio advertisement for the Recipient.

11. The method for delivering voice messages of claim 10, wherein the first audio advertisement played for the Sender is different from the second audio advertisement played for the Recipient.

12. The method for delivering voice messages of claim 1 further comprising, after step (d) and prior to step (e):
    determining that the Recipient has not answered the first outbound call;
    placing a predetermined number of further outbound calls to the telephone number of the Recipient;
    determining that the Recipient has not answered a call in the set of further outbound calls;
    alerting the Sender that the original audio message was not delivered to the Recipient; and calling one or more times, after alerting the sender, at least one of, according to instructions from the Sender, the telephone number of the Recipient and a different telephone number at which the Recipient can be reached.

13. The method for delivering voice messages of claim 1, wherein the Recipient is not required to have a voice mailbox within the voice messaging system.

14. A voice messaging system for delivering voice messages comprising a voice message server, wherein the voice message server operates to:

(a) receive an inbound call from a Sender, wherein the Sender lacks a voice mailbox within the voice messaging system and the Sender lacks an agreement to pay a provider of the voice messaging system for the use of the voice messaging system;

(b) record, free of charge to the Sender, a original audio message from the Sender intended for a Recipient;

(c) receive from the Sender a telephone number of the Recipient;

(d) place a first outbound call by calling the telephone number of the Recipient; and (e) play, free of charge to the Sender, the original audio message for the Recipient.

15. The voice messaging system for delivering voice messages of claim 14, wherein the voice message server additionally operates to:

(f) receive a reply telephone number of the Sender.

16. The voice messaging system for delivering voice messages of claim 15, wherein the voice message server additionally operates to:

(g) record a reply audio message from the Recipient intended for the Sender;

(h) place a second outbound call by calling the reply telephone number of the Sender; and (i) play the reply audio message for the Sender.

17. The voice messaging system for delivering voice messages of claim 14, wherein the voice message server additionally operates to:

(f) forward the original audio message.

18. The voice messaging system for delivering voice messages of claim 17, wherein, in operating to forward the original audio message, the voice message server operates to:

(f-1) receive from the Recipient a telephone number of a Forward Recipient;

(f-2) place a second outbound call by calling the telephone number of the Forward Recipient; and (f-3) play the original audit message for the Forward Recipient.

19. The voice messaging system for delivering voice messages of claim 18, wherein the voice message server additionally operates to:

(g) record a forward audio message from the Recipient; and (h) play the forward audio message for the Forward Recipient.

20. The voice messaging system for delivering voice messages of claim 14, wherein the voice message server additionally operates to:

(f) save the audio message.

21. The voice messaging system for delivering voice messages of claim 20, wherein, in operating to save the audio message, the voice message server operates to:

(f-1) instruct the Recipient to not answer the telephone on the next call;

(f-2) terminate the first outbound call to the Recipient;

(f-3) place a second outbound call by calling the telephone number of the Recipient; and (f-4) record the original audio message into an answering machine of the Recipient.

22. The voice messaging system for delivering voice messages of claim 14, wherein the voice message server additionally operates to:

(f) play a first audio advertisement for the Sender.

23. The voice messaging system for delivering voice messages of claim 22, wherein the voice message server additionally operates to:

(g) play a second audio advertisement for the Recipient.

24. The voice messaging system for delivering voice messages of claim 23, wherein the first audio advertisement played for the Sender is different from the second audio advertisement played for the Recipient.

25. The voice messaging system for delivering voice messages of claim 14, wherein the voice message server additionally operates to, after operating to perform operation (d) and prior to operating to perform operation (e):

determine that the Recipient has not answered the first outbound call;

place a predetermined number of further outbound calls to the telephone number of the Recipient;

determine that the Recipient has not answered a call in the set of further outbound calls;

alert the Sender that the original audio message was not delivered to the Recipient; and call one or more times, after operating to alert the sender, at least one of, according to instructions from the Sender, the telephone number of the Recipient and a different telephone number at which the recipient can be reached.

* * * * *